United States Patent [19]

Alsen et al.

[11] Patent Number: 4,710,070
[45] Date of Patent: Dec. 1, 1987

[54] DEVICE IN BACK SPOT FACING TOOLS

[75] Inventors: Per Alsen; Timo Salo, both of Göteborg, Sweden

[73] Assignee: Erix Tool AB, Göteborg, Sweden

[21] Appl. No.: 830,134

[22] Filed: Feb. 18, 1986

[30] Foreign Application Priority Data

Feb. 15, 1985 [SE] Sweden ............................... 8500707

[51] Int. Cl.⁴ ............................................ B23B 51/00
[52] U.S. Cl. ...................................... 408/93; 408/187; 408/227
[58] Field of Search ............... 408/147, 150, 187, 188, 408/195, 93; 407/7, 8; 82/1.5

[56] References Cited

U.S. PATENT DOCUMENTS

| 3,372,610 | 3/1968 | Johansson | 408/227 |
| 3,540,324 | 11/1970 | Johansson | 408/227 |
| 3,690,357 | 9/1972 | Lugo | 408/187 |

FOREIGN PATENT DOCUMENTS 28408 2/1983 Japan ..................... 408/147

Primary Examiner—Z. R. Bilinsky
Attorney, Agent, or Firm—Cushman, Darby & Cushman

[57] ABSTRACT

A device in back spot facing tools of the kind comprising a spindle (11), at one front end portion (12) of which, at least one wing (14) is arranged in a recess (13) and pivotally mounted parallel with and eccentrically with respect to the spindle about an axle (15, 16). The wing is at the rotation of the spindle arranged to pivot from an inactive position within the circumference of the spindle to an active position outside it. It is at the part of the wing located outside of the spindle provided with at least one cutting edge and/or a cutter (17). The pivoted part of the wing (14) outside the spindle (12) is at least at its one preferably its front end surface (21) designed with an inclined ramp (22), which in the extended position of the wing, has its maximum height, as seen in the axial direction of the wing, in a portion located closest to the circumference of the spindle (12) and is arranged to incline towards the external, curved envelope surface (23) of the wing. The transition section (29) of the ramp (22) in the envelope surface (23) of the wing is slightly chamfered, so that at the insertion of the spindle in a boring (20) of a workpiece (19), the portion of the wing (14) which during the rotation is pivoted outwards is in contact with the hole edge (27) of the boring and is pivoted to the inactive position at the continued displacement in the boring.

5 Claims, 5 Drawing Figures

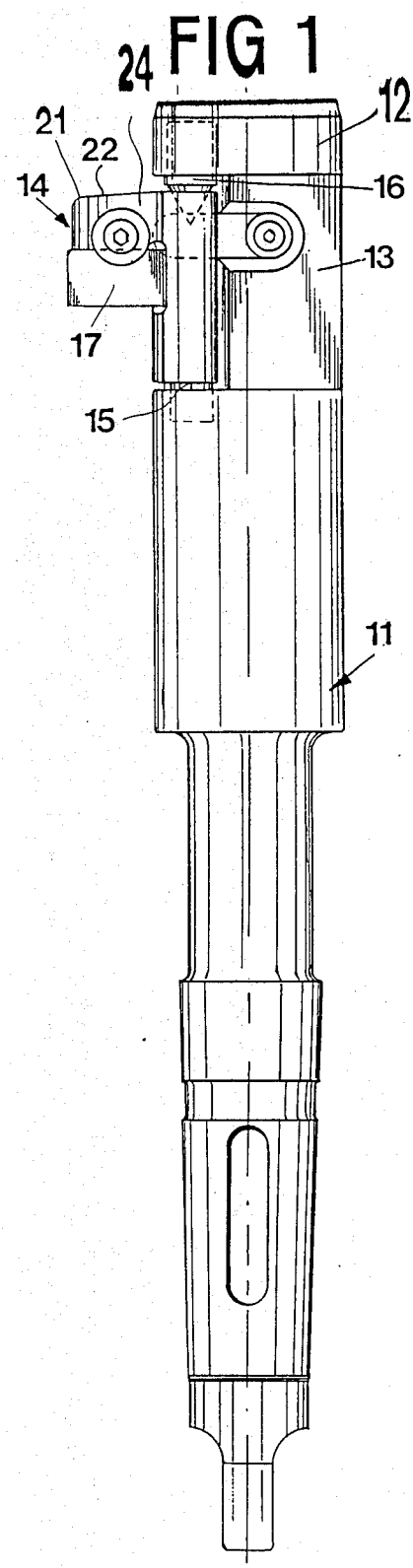
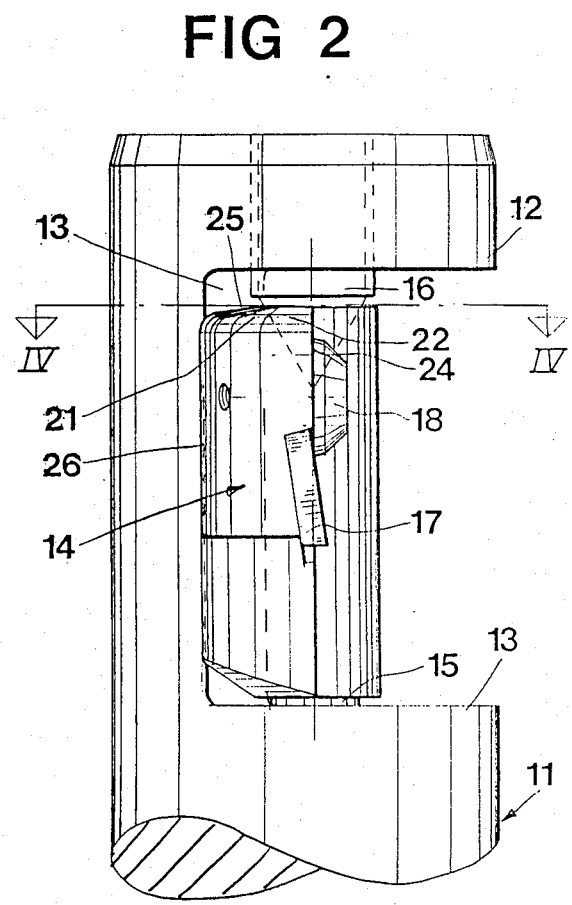
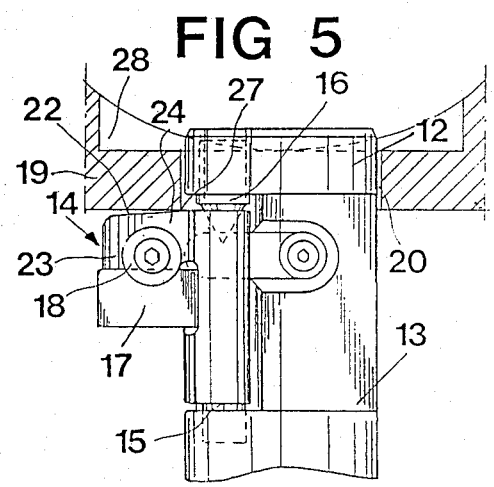

DEVICE IN BACK SPOT FACING TOOLS

The present invention relates to a device in back spot facing tools of the kind comprising a spindle at one, front end portion of whch, at least one wing is arranged in a recess pivotally mounted parallel with and eccentrically with respect to the spindle about an axle, which wing at the rotation of the spindle is arranged to pivot from an inactive position within the circumference of the spindle to an active position outside it, and which at the part of the wing located outside of the spindle is provided with at least one cutting edge and/or a cutter.

BACKGROUND OF THE INVENTION

Back spot facing tools of the above mentioned kind are previously known through U.S. Pat. No. 3,540,324. These tools have proved to be exceptionally good concerning both function, safety of operation and applicability. In some cases difficulties can appear when the wing during rotation is to be retracted to inactive position in order to introduce the spindle through a boring in a workpiece, the rear side of which is to be provided with a spot recess or the like. Irrespective of the rotational direction the wing will through the centrifugal force be pivoted out to an active position, and if the wing is to be retracted into a recess int he spindle, the front end surface of the wing is brought to contact with the workpiece at which normally a retraction of the wing to inactive position takes place. If the friction between the wing and the workpiece is not sufficiently high, for example if there is oil on the workpiece and/or the workpiece is smooth after the boring operation, the wing will remain in its extended position even at high pressures against the workpiece and the spindle can therefore not be passed into the boring. The retraction of the wing has up to now occured because of the friction between the front end surface of the wing and the contact surface on the workpiece outside the hole.

THE OBJECT AND MOST IMPORTANT FEATURES OF THE INVENTION

The object of the present invention is to provide a device in back spot facing tools which enables a safe retraction of the wing to inactive position, without making the tool more complicated or expensive. This has been provided by the fact that said pivoted part of the wing outside the spindle at least at one preferably its front end surface is designed with an inclined ramp, that the ramp in the extended position of the wing has its maximum height, as seen in the axial direction of the wing, in a portion located closest to the circumference of the spindle and is arranged to incline towards the external, curved envelope surface of the wing, and that the transition section of the ramp in the envelope surface of the wing is slightly chamfered, so that at the insertion of the spindle in a boring to a workpiece, the portion of the wing which during the rotation is pivoted outwards is in contact with the hole edge of the boring and is pivoted to the inactive position at a continued displacement in the boring.

The wing is retracted only by friction between the inclined ramp of the wing and the hole edge in the workpiece. There will be almost a line contact which will function irrespective of how smooth the surface of the workpiece about the hole may be.

DESCRIPTION OF THE DRAWINGS

FIG. 1 shows a side view of the back spot facing tool according to the invention with extended wing.

FIG. 2 shows the tool according to FIG. 1, 90° rotated as compared with the side view according to FIG. 1.

FIG. 5 shows the active part of the tool in cooperation with a workpiece.

DESCRIPTION OF EMBODIMENTS

Figure 3:
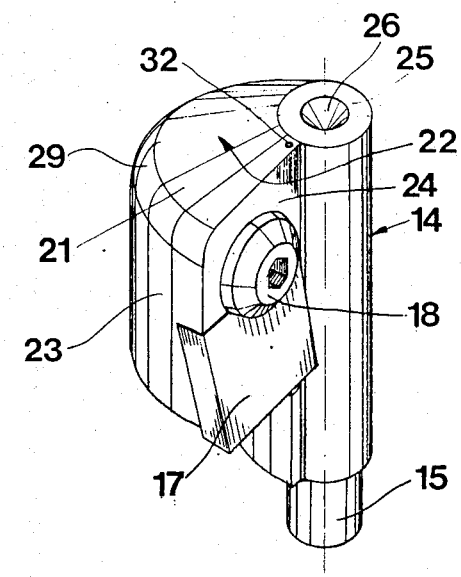
FIG. 3 shows the wing of the back spot facing tool according to FIGS. 1 and 2 in a perspective on a larger scale.

The back spit facing tool according to the invention is in essential parts similar to conventional back spot facing tools, which consist of a spindle 11, at one front end 12 of which there is arranged a recess 13, in which a wing 14 is pivotally mounted. This can swing about an axle consisting of two pivots 15,16 and arranged parallel with and eccentrically with respect to the spindle 11 from an inactive position within the circumference of the spindle to an active position in which a larger part of the wing is located outside the circumference of the spindle. The wing 14 can either in itself be designed with one or several cutting edges and/or provided with one or severals cutters 17 fixed to the front edge of the wing by means of a screw 18 or the like.

If a back spot facing operation is to be performed in a workpiece 19, which is provided with a through boring 20, a back spot facing tool is selected, the spindle diameter of which is somewhat smaller than the diameter of the boring, so that it can be passed through the boring without difficulty. The rear end of the back spot facing tool, i.e. the shank, is fixed in a boring machine or the like and is rotated in the direction opposite the cutting direction., Then the wing 14 with the cutter will be pivoted by the centrifugal force to active position with the cutter located outside the circumference of the spindle. In order to provide a safe retraction of the wing, so that it becomes located in the recess 13 in front of the circumference of the spindle, one end surface 21 of the wing 14 facing the front end 12 of the spindle is designed as a ramp 22, which inclines from the transition section between the part-cylindric envelope surface 23 of the wing and the end surface 21 of the wing in a direction obliquely upwards towards the envelope surface 31 of the spindle 11, i.e. in the shown embodiment in a direction towards the plane bearing surface 25 of the wing, where the recess 26 for the pivot 16 is arranged. The inclined ramp 22 of the extended wing thus has its maximum height close to the spindle and inclines downwards towards the envelope surface 23 of the wing, at which the transition section 29 between this and the ramp 22 is slightly chamfered. The ramp 22 preferably inclines also in the direction from the front edge 24 of the wing, where the cutter 17 is fixed, and slightly downwards, backwards towards the envelope surface 23 of the wing, so that its highest point 32 is located on the front edge of the wing.

Figure 4:
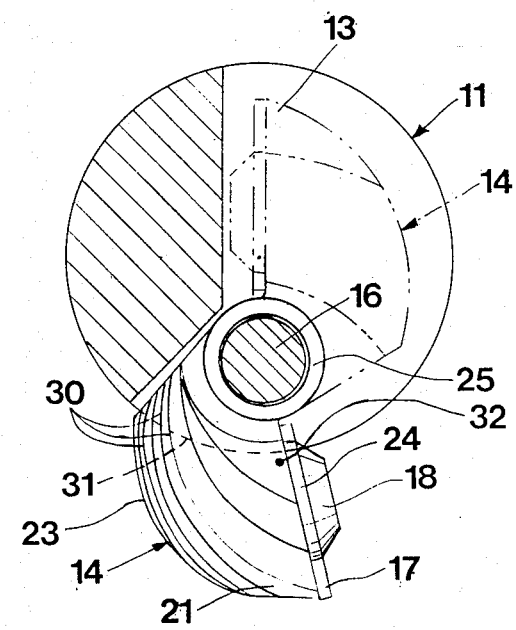
FIG. 4 is a section according to the line IV—IV in FIG. 2.

In FIG. 4 on the front and upper end surface 21 of the wing 14 equidistance lines 30 are drawn, which show the rise of the inclination and extension as seen from above. The extension of the equidistance lines 30 coincide substantially with the curving of the spindle circumference and the hole edge 27 respectively, which means that only line or point contact is obtained at the contact of the ramp with the hole edge 27 of the workpiece 19.

When pressing the wing 14 of the baack spot facing tool against the workpiece 19 the ramp 22 will thrust against the edge 27 of the boring hole 20 (FIG. 5), which in cooperation with the inclined plane of the ramp gives the wing, which is mounted eccentrically in spindle, a pivoting movement in a direction towards the recess 13 of the spindle in cooperation with the rotation of the spindle. The inclination and extension of the ramp is so selected that the edge of the boring hole 27 is active during the whole retraction movement of the wing.

When the wing has taken its inactive position inside the circumference of the spindle the front end portion of the spindle may be passed through the boring 20 and when the entire wing is located on the other side of the workpiece 19 the boring machine is reversed so that it rotates in the cutting direction and the spot facing 28 or the like can be started by withdrawing the spindle. When the work is finished the spindle is reversed again so that it rotates in a direction opposite the cutting direction, after which the spindle is withdrawn, so that the cutter of the wing will be in contact with the back spot facing 28. This contact will causes a retraction of the wing to an inactive position. The back spot facing tool can then be withdrawn from the boring 20.

It has proved to be appropriate to desing the ramp 22 with a pitch angle of about 10°.

The invention is not limited to the described and shown embodiments but several modifications are possible within the scope of the claims. Thus it is possible to arrange a corresponding ramp at the bottom end surface of the wing.

We claim:

1. A back spot facing tool of the type comprising a spindle and at least one wing having a curved external envelope surface and arranged in a recess at one front end portion of said spindle, said wing being pivotally mounted about an axis parallel witht he spindle and eccentric to the spindle axis, said wing being arranged upon rotation of the spindle to pivot from an inactive position inside the circumference of the spindle to an active position outside the spindle, the part of the wing projecting outside the spindle being provided with at least one cutting edge, characterized in that, when the wing is in its full active position, the part of the wing which is outside the spindle has an end surface provided with an inclined ramp having the maximum height as seen in the axial direction of the spindle at a portion located closest to the circumference of the spindle and that a transitional portion between the ramp and the envelope surface of the wing is slightly chamfered, in order to ensure that the portion of the wing, which during rotation projects from the spindle, at insertion of the tool in a bore in a work piece, engages the bore edge and is pivoted to inactive position upon continued displacement in the bore.

2. A tool as in claim 1 wherein the inclined surface of the ramp extends over the entire front end surface of the wing and is designed only to give line or point contact against a work piece.

3. A tool as in claim 1 wherein the angle of inclination of the ramp is about 10°.

4. A tool as in claim 2 wherein the angle of inclination of the ramp is about 10°.

5. A back spot facing tool comprising:
a spindle having a forward end portion and a laterally facing recess near said forward end portion;
a wing pivotally mounted in said recess for rotation about an axis parallel to and eccentric to the axis of the spindle, said wing being pivotal between an inactive position inside the circumference of the spindle and an active position in which part of the wing projects outside the circumference of the spindle, said part of said wing having a front edge lying generally in a radial plane relative to said rotation axis and carrying a cutting edge, a side surface which is curved about said rotation axis such that side surface extends from said front edge toward said rotation axis and a forward end surface facing the forward end portion of said spindle, said forward end surface being shaped as an inclined ramp which, when the wing is in its full active position slopes downwardly from the axially central part of said forward end surface toward said curved side surface and merges into said curved side surface axially central part of said forward end surface toward said curved side surface and merges into said curved side surface along chamfered surface.

* * * * *